US010711917B2

(12) United States Patent
Howitt

(10) Patent No.: US 10,711,917 B2
(45) Date of Patent: Jul. 14, 2020

(54) METHOD AND APPARATUS FOR VALVE POSITION STATE ESTIMATION

(71) Applicant: INFOSENSE, INC., Charlotte, NC (US)

(72) Inventor: Ivan Howitt, Charlotte, NC (US)

(73) Assignee: INFOSENSE, INC., Charlotte, NC (US)

( * ) Notice: Subject to any disclaimer, the term of this patent is extended or adjusted under 35 U.S.C. 154(b) by 228 days.

(21) Appl. No.: 14/914,352

(22) PCT Filed: Aug. 22, 2014

(86) PCT No.: PCT/US2014/052235
§ 371 (c)(1),
(2) Date: Feb. 25, 2016

(87) PCT Pub. No.: WO2015/031180
PCT Pub. Date: Mar. 5, 2016

(65) Prior Publication Data
US 2016/0208952 A1 Jul. 21, 2016

Related U.S. Application Data

(60) Provisional application No. 61/870,279, filed on Aug. 27, 2013.

(51) Int. Cl.
*G01N 29/36* (2006.01)
*F16K 37/00* (2006.01)
(Continued)

(52) U.S. Cl.
CPC ......... *F16K 37/0075* (2013.01); *G01N 29/04* (2013.01); *G01N 29/043* (2013.01);
(Continued)

(58) Field of Classification Search
CPC .... F16K 37/0075; G01N 29/36; G01N 29/34; G01N 29/04; G01N 29/043; G01N 29/14;
(Continued)

(56) References Cited

U.S. PATENT DOCUMENTS 4,821,769 A * 4/1989 Mills ................... F16K 37/0041
137/554
5,154,080 A 10/1992 Hill et al.
(Continued)

FOREIGN PATENT DOCUMENTS

EP 1457856 B1 4/2004

OTHER PUBLICATIONS

Jan. 20, 2015 International Search Report issued in International Application No. PCT/US2014/052235.

*Primary Examiner* — Xin Y Zhong
(74) *Attorney, Agent, or Firm* — Clements Bernard Walker; Christopher L. Bernard

(57) ABSTRACT

A method and apparatus for valve position state estimation within a conduit or conduit network, comprising: acoustically coupling a plurality of acoustic sensors to a fluid disposed within the conduit or conduit network, wherein one of the plurality of acoustic sensors is disposed upstream of a valve under test and one of the plurality of acoustic sensors is disposed downstream of the valve under test; transmitting a structured acoustic signal from a transmitting acoustic sensor to a receiving acoustic sensor, wherein the structured acoustic signal passes through the valve under test between the transmitting acoustic sensor and the receiving acoustic sensor; at the transmitting acoustic sensor, receiving a reflected structured acoustic signal after the structured acoustic signal is reflected from the valve under test; and, using a two-port analysis, characterizing a flow state of the valve under test based on the structured acoustic signal received at the receiving acoustic sensor and the reflected (Continued)

structured acoustic signal received at the transmitting acoustic sensor. The method further comprising coupling an accelerometer sensor to the valve under test and obtaining vibrational measurements from the valve under test.

16 Claims, 9 Drawing Sheets

(51) Int. Cl.
    *G01N 29/14*     (2006.01)
    *G01N 29/04*     (2006.01)
    *G01N 29/34*     (2006.01)

(52) U.S. Cl.
    CPC ............. *G01N 29/14* (2013.01); *G01N 29/34* (2013.01); *G01N 29/36* (2013.01); *G01N 2291/044* (2013.01); *G01N 2291/103* (2013.01); *G01N 2291/106* (2013.01); *G01N 2291/2698* (2013.01)

(58) Field of Classification Search
    CPC ....... G01N 2291/103; G01N 2291/106; G01N 2291/044; G01N 2291/2698
    See application file for complete search history.

(56) References Cited

U.S. PATENT DOCUMENTS

| | | |
|---|---|---|
| 5,257,545 A | 11/1993 | Au-Yang |
| 6,453,247 B1 | 9/2002 | Hunaidi |
| 2009/0250125 A1 | 10/2009 | Howitt |
| 2010/0032492 A1 | 2/2010 | Grimm et al. |
| 2012/0051186 A1* | 3/2012 | Holley .................. E21B 33/035 367/131 |
| 2013/0030778 A1* | 1/2013 | Andoji .................. G06Q 10/06 703/6 |
| 2013/0211797 A1 | 8/2013 | Scolnicov et al. |

* cited by examiner

METHOD AND APPARATUS FOR VALVE POSITION STATE ESTIMATION

CROSS-REFERENCE TO RELATED APPLICATION

The present patent application/patent claims the benefit of priority of U.S. Provisional Patent Application No. 61/870,279, filed on Aug. 27, 2013, and entitled "METHOD AND APPARATUS FOR VALVE POSITION STATE ESTIMATION," the contents of which are incorporated in full by reference herein.

FIELD OF THE INVENTION

The present invention relates generally to a method and apparatus for evaluating the state of valves within a pipeline or pipeline network that transports fluid and/or gas. More specifically, the present invention provides a valve-state-estimate, e.g., open, closed, or percent open/closed, for valves-under-test within a pipeline or pipeline network. The sensors involved utilize acoustic and/or vibrational signals.

BACKGROUND OF THE INVENTION

Valves are ubiquitous for regulating, controlling, and isolating fluids within conduits. Whether for transmission/distribution of gas, oil, water, or within an industrial process, valves play a critical role in maintaining efficient, safe, and reliable system operation. Valve failure can lead to system inefficiencies, the inability to assess/control the system's operational state, or catastrophic system failure.

In water distribution systems, valves are primarily used for two purposes: flow/pressure control and isolating subsystems. Subsystem isolation is required to perform repairs or to isolate contaminants. Based on water utility surveys, typically over 85% of the valves within the distribution network are used for isolation. Buried gate valves with valve boxes are typically used for isolation of small-diameter water mains, over 90%, and butterfly valves, approximately 1%, are direct buried or installed in chambers and are typically used for large diameter mains. Typical valve density is between 10 to 20 valves per linear mile of distribution water mains and at least 2 to 3 valves per mile of transmission mains.

Isolation valves are prone to deterioration and failures, such as stripped, broken, or bent stems; leaking O-rings or packing; sedimentation or tuberculation preventing full closure, corrosion of the valve body and connecting bolts; and wear on the valve disk and seat. Based on water utility surveys, utilities reported that nonfunctioning valves were found under emergency situations on average 9% of the time and annually between 1 and 12 valve malfunctions were found per 100 linear miles of water mains. As another datum on the importance of valve reliability, a study conducted by the Boston Water and Sewer Commission found 120 out of 2800 isolation valves could not be operated, i.e., 4.3%. In addition to valve operational failure, there is operator failure to correctly set the desired operational setting for the valve, e.g., open or closed. This can be caused by having a mixture of left and right handed valves in the system, as well as due to variations in the number of turns required to set the desired valve state. Utilities reported, on average, 2 times/year valves were set in the wrong position because of left-hand/right-hand confusion.

Isolation valves left in the incorrect state or closed cause operational hazards: inefficiencies and "dead end" segments. Back pressure and incorrect flow patterns caused by closed valves cause reduced flow rates requiring increased pumping to deliver the required pressure to customers. This requires additional "wasted" energy or, in the worst case, additional capacity is provided by adding pipe lines to the distribution network. In addition, closed isolation valves cause "dead end" line segments in which water stagnates and sediment builds up. When the valve is opened, stagnate (and possibly septic) water is released, causing a potential health risk to customers downstream.

In gas and oil transmission/distribution systems and industrial process systems, valves are used widely on installations for controlling the flow of fluids. The type of valve is dependent on the application, with common valve types being bleed, block, check, choke, control, relief, and emergency shutdown. Valve failure can be caused by a number of issues, with failure modes grouped into two general categories: fugitive emissions and operational failure. Fugitive emissions are caused by valve leakage at the stem to the environment outside the pipe. This mode of failure is not addressed by the present invention. The invention is designed to address operational (including mechanical) failures, such as: failure to fully open, failure to fully close, failure to operate, and failure to seal. In addition, valve operational failure is often caused by operator error, e.g., leaving a valve partially open. To illustrate, in one example, 40% of the block valve failures were due to the valve being left at least partially open, with an additional 25% due to defective operating procedures. Minimizing operational failures requires a regimen of inspection and maintenance with effective operating procedures to minimize operator error.

Various valve leak detection techniques and systems have been developed using passive detection techniques, i.e., transducers are used to detect the pressure wave caused by a valve leaking. For example, the Powell and Dimick invention (U.S. Pat. No. 5,650,943) is based on passive acoustic detection at three locations upstream, downstream, and at the valve. Detection is based on an acoustic signal generated by the valve leaking and the three acoustic signatures are used for valve leak detection. The Farstad and Cremean invention (U.S. Pat. No. 5,361,636) is based on using an accelerometer attached to a pipe wall to measure the acoustic pressure wave generated by a fluid within a pipe resulting from a valve leak. The Leon and Heagerty inventions (U.S. Pat. Nos. 6,128,946 and 6,134,949) are based on passive detection of pressure wave transient at both the upstream and downstream from an emergency shutdown valve. The detected transient waves are evaluated to detect a leaky valve. The Balaschak invention (U.S. Pat. No. 5,616,829) is based on using a vibration sensor to detect leakage. When vibration is detected, a driving unit for the valve stem is used to fully seat the valve. The Kumpfmueller (U.S. Pat. No. 6,530,277) and Fiebelkorn (U.S. Pat. No. 6,637,267) and Ens and Püttmer (U.S. Pat. No. 6,976,503) inventions are based on using body sound spectra on the valve in conjunction with a position controller. The spectra are recorded in both open and closed position and are stored to be used in evaluating a non-sealed condition.

The following address inventions limited to valve state detection using passive detection techniques. The Ens and Püttmer invention (U.S. Pat. No. 7,621,179) is based on passive detection of the solid-borne sound spectrum for a check valve in both the closed and open states. The detection timing is conducted to reduce ambient noise such that the sound spectrum in the check valve's two states is used to determine if the valve is seating correctly. The Taylor invention (U.S. Pat. No. 6,685,638) is based on detecting the audible "click" produced by the valve in order to determine the position of the valve where the valve's position is controlled by a stepper motor. The Cobb invention (U.S. Pat. No. 4,896,101) uses trend analysis in changes in power, temperature, motor noise, and downstream fluid flow noise to monitor electro-mechanical or pneumatically driven valves. The Abdel-Malek invention (U.S. Pat. No. 5,616,824) is based on evaluating the electromechanical response for an electromechanical control valve to assess the valve's condition. The Stewart and Foresman invention (U.S. Pat. No. 7,784,490) is based on the valve stem having an activator, e.g., a magnet, which can be sensed to determine the valve's position. The Breen invention (U.S. Pat. No. 7,313,497) is based on measuring the pressure differential across a valve. The measured differential is compared to the required differential to evaluate the valve's condition.

The McShane and Ulerich invention (U.S. Pat. No. 5,115,672) uses an active ultrasonic transducer pair (transmitter and receiver) to interrogate the fluid flow in the cross section of the pipe downstream from the valve. The transducers are attached to the outside of the pipe wall. The signature of the received transmission through a turbulent fluid is used to estimate the valve's condition. Even though this approach uses an active transmission, it is measuring the cross-sectional characteristics of the fluid flow and not directly evaluating the transmission/reflection characteristics of the valve.

The following address inventions to assist in maintaining valves in a water distribution system. The Murphy invention (U.S. Pat. No. 6,125,868) uses a portable computerized system in conjunction with a robotic valve turning machine used to exercise and record the operation results. The Buckner and Buckner invention (U.S. Pat. No. 8,033,299) is based on a combined vacuum, water jetter, and valve actuator used for a valve exercise program.

The following address inventions to determine valve characteristics/state through system monitoring. The Schoonover invention (U.S. Pat. No. 7,089,086) is based on observing valve information while a valve operates in response to control signals which systematically exercise the valve. During normal operation, valve characteristics are then determined based on collected valve information. The Pyötsia invention (US 2011/0295407) is based on monitoring the system process to identify the operating points for the valves.

Thus, a primary application for the related art is valve leak detection due to a faulty valve seating. A number of the inventions exploit passive detection of the pressure wave caused by turbulence when the valve does not seat. One invention uses active detection to interrogate the pipes cross-section downstream of the pipe. Both the active and the passive detection inventions are based on indirect evaluation of the valve-state exploiting the turbulence caused by the valve not seating to classify the valve-state. These approaches also require placement of sensors either on or near the valve-under-test. In addition, the related art has taught that augmenting the valve with mechanical and/or electrical attributes can provide valve-state information. A limitation of these approaches is that failure of the mechanical and/or electrical attributes will result in a false valve-state-estimation.

BRIEF SUMMARY OF THE INVENTION

The present invention addresses the issues with the related art based on the following innovations: valve-state is directly evaluated, evaluation is not solely dependent on leaky valve induced turbulence, sensors are not necessarily mounted near the valve-under-test, and measurements can be aggregated to evaluate multiple valve-states within a pipeline network. The present invention has several modes of operation. The valve-state is evaluated using either acoustic sensors and/or accelerometer sensors. The acoustic sensors are directly coupled into the fluid transported by the pipeline or the pipeline network. The sensors are located upstream and downstream from the valve(s)-under-test. One acoustic sensor transmits a structured acoustic signal and the other acoustic sensor receives the transmission which passes through the valve(s). The reflected signal from the valve is also received by the transmitting acoustic sensor. In this fashion, the feature set used to classify the valve-state(s) within the pipeline segment is based on its full two-port analysis. Vibrational measurements at the valve using accelerometer sensors can be used to augment the feature set and to provide additional discrimination power for the classification process. The pipeline section feature sets collected between multiple deployments of the acoustic sensors and accelerometer sensors can be combined using network theory to evaluate and classify the state of multiple valves located within a pipeline network.

In one exemplary embodiment, the present invention provides a method for valve position state estimation within a conduit or conduit network, comprising: acoustically coupling a plurality of acoustic sensors to a fluid disposed within the conduit or conduit network, wherein one of the plurality of acoustic sensors is disposed upstream of a valve under test and one of the plurality of acoustic sensors is disposed downstream of the valve under test; transmitting a structured acoustic signal from a transmitting acoustic sensor to a receiving acoustic sensor, wherein the structured acoustic signal passes through the valve under test between the transmitting acoustic sensor and the receiving acoustic sensor; at the transmitting acoustic sensor, receiving a reflected structured acoustic signal after the structured acoustic signal is reflected from the valve under test; and, using a two-port analysis, characterizing a flow state of the valve under test based on the structured acoustic signal received at the receiving acoustic sensor and the reflected structured acoustic signal received at the transmitting acoustic sensor. The method further comprising coupling an accelerometer sensor to the valve under test and obtaining vibrational measurements from the valve under test. The method further comprising characterizing the flow state of the valve under test based on the vibrational measurements obtained by the accelerometer sensor. In general, characterizing the flow state of the valve under test comprises characterizing a degree to which the valve under test is opened or closed.

In another exemplary embodiment, the present invention provides an apparatus for valve position state estimation within a conduit or conduit network, comprising: a plurality of acoustic sensors configured to be acoustically coupled to a fluid disposed within the conduit or conduit network, wherein one of the plurality of acoustic sensors is disposed upstream of a valve under test and one of the plurality of acoustic sensors is disposed downstream of the valve under test; the plurality of acoustic sensors operable for transmitting a structured acoustic signal from a transmitting acoustic sensor to a receiving acoustic sensor, wherein the structured acoustic signal passes through the valve under test between the transmitting acoustic sensor and the receiving acoustic sensor; the plurality of acoustic sensors operable for, at the transmitting acoustic sensor, receiving a reflected structured acoustic signal after the structured acoustic signal is reflected from the valve under test; and an algorithm for, using a two-port analysis, characterizing a flow state of the valve under test based on the structured acoustic signal received at the receiving acoustic sensor and the reflected structured acoustic signal received at the transmitting acoustic sensor. The apparatus further comprising an accelerometer sensor configured to be coupled to the valve under test and obtain vibrational measurements from the valve under test. The apparatus further comprising an algorithm for characterizing the flow state of the valve under test based on the vibrational measurements obtained by the accelerometer sensor. In general, characterizing the flow state of the valve under test comprises characterizing a degree to which the valve under test is opened or closed.

BRIEF DESCRIPTION OF THE DRAWINGS

The present invention is illustrated and described herein with reference to the various drawings, in which like reference numbers are used to denote like apparatus components/method steps, as appropriate, and in which.

DETAILED DESCRIPTION OF THE INVENTION

Depending on the mode of operation, the Hydro-RAT valve-state-estimation is based on evaluating either one or two signal modalities—acoustic and/or vibrational. The acoustic signal is generated, received, processed, and evaluated by the Hydrophone/Projector Sensor Unit (H/P-SU) and the vibrational signal is received, processed, and evaluated by the accelerometer sensor unit (A-SU). The structured acoustic signal generated by the H/P-SU can be produced by a hydrophone operating as a projector or by an alternative acoustic source that can produce a structured and repeatable signal, such as a tapping machine or the like. Under the operational modes where both acoustic and vibrational signals are processed, the valve-state-estimation is conducted at either the hydrophone/projector sensor unit and/or the accelerometer sensor unit.

Figure 1:
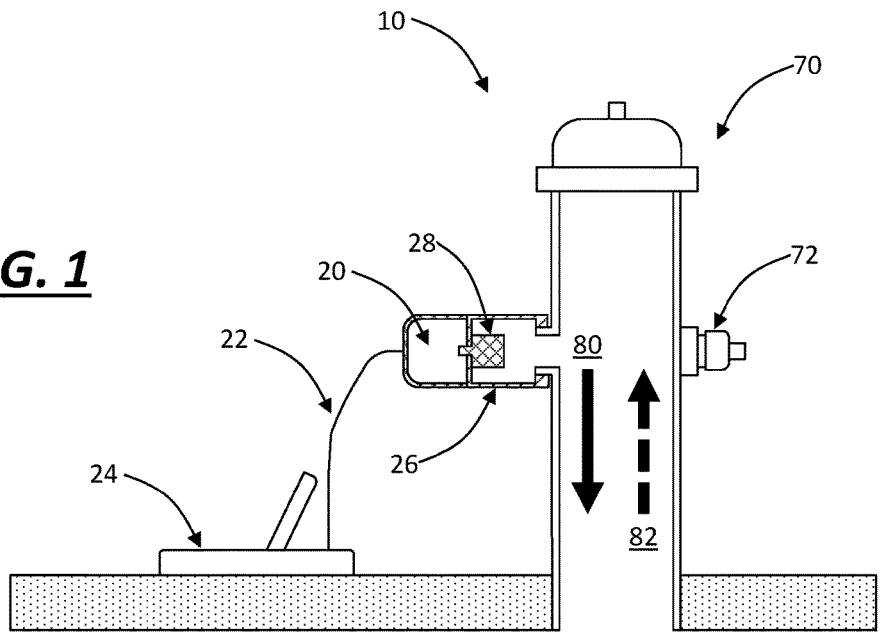
FIG. 1 is a schematic diagram illustrating one exemplary embodiment of the deployment of the hydrophone/projector sensor unit of the present invention—the hydrophone/projector sensor unit (H/P-SU) is one of the sensor units for the hydro-rapid assessment tool (Hydro-RAT) of the present invention.

Hydrophone/Projector Sensor Unit (H/P-SU): Referring to FIG. 1, an embodiment of the H/P-SU deployment 10 is illustrated. The control unit 24 interfaces via a cable 22 or wireless transceiver to the preamplifier/amplification subsystem 20. The preamplifier/amplification subsystem 20 and the hydrophone/projector 28 are contained in a ruggedized-watertight housing 26. In this embodiment, the housing 26 allows the H/P-SU to be connected to a fire hydrant 70 through either one of the two hose nozzles 72, standard features on fire hydrants. The control unit 24 is used to initiate valve-state-estimate test cycles, by generating structured acoustic signals 80. The acoustic signals 80 are coupled into the water distribution system through the hydrophone/projector 28. In turn, reflected and received acoustic signals 82 are detected by the hydrophone/projector 28 and are used to evaluate the valve-state-estimate.

Figure 2:
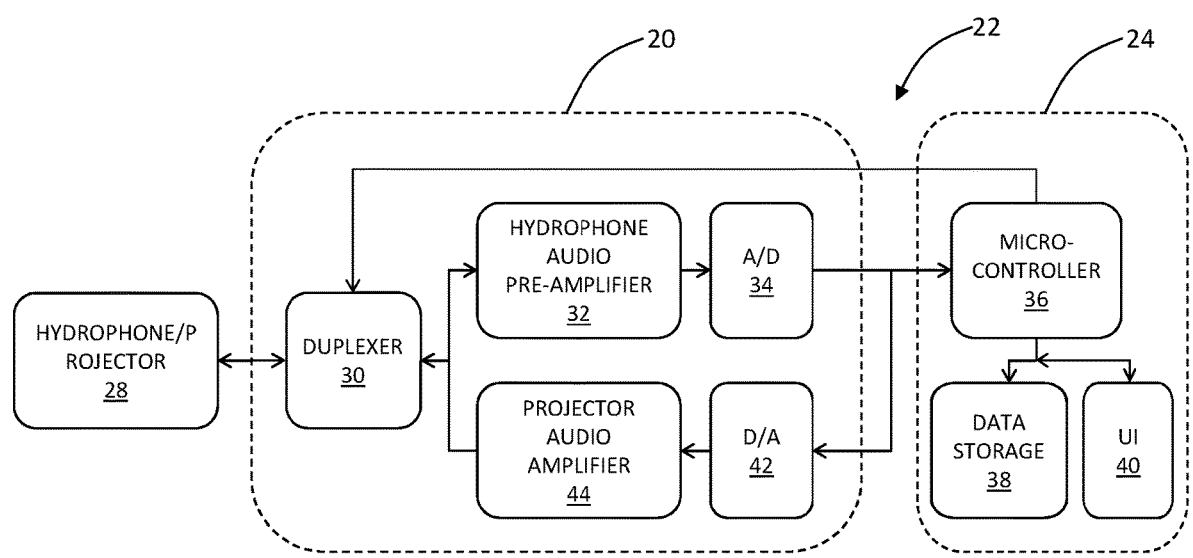
FIG. 2 is a schematic diagram illustrating one exemplary embodiment of the H/P-SU.

Referring to FIG. 2, a schematic for an embodiment of the H/P-SU is illustrated. Transmitted acoustic signals 80 are generated by the micro-controller 36 either directly generating a structured digital signal or by retrieving a structured digital signal from data storage 38. The structured digital signal is, as an example, a square wave, a stepped tone sequence, a chirp waveform, or a pseudo-random sequence. The structured digital signal is converted to an analog signal 42 and amplified 44. The micro-controller 36 sets the duplexer 30 to transmit the signal to the portion of the water distribution under test via the hydrophone/projector 28.

An acoustic signal 82 is received through the hydrophone/projector 28 with the duplexer 30 set by the micro-controller 36 to receive signals. The analog signal is amplified 32 and converted to a digital signal 34. The micro-controller 36 then processes the received digital acoustic signal to determine the valve-state-estimate. The received signal and related data are stored to the data storage 38. The process is controlled by an operator either locally or remotely via the User Interface 40. The valve-state-estimate evaluation may use additional information concerning the portion of the water distribution system under test, as an example, the vibrational signal for the valve-state-estimate reported by the A-SU, the GIS (geographic information system) layout of the water distribution system and/or prior H/P-SU and A-SU recorded measurements.

Figure 3:
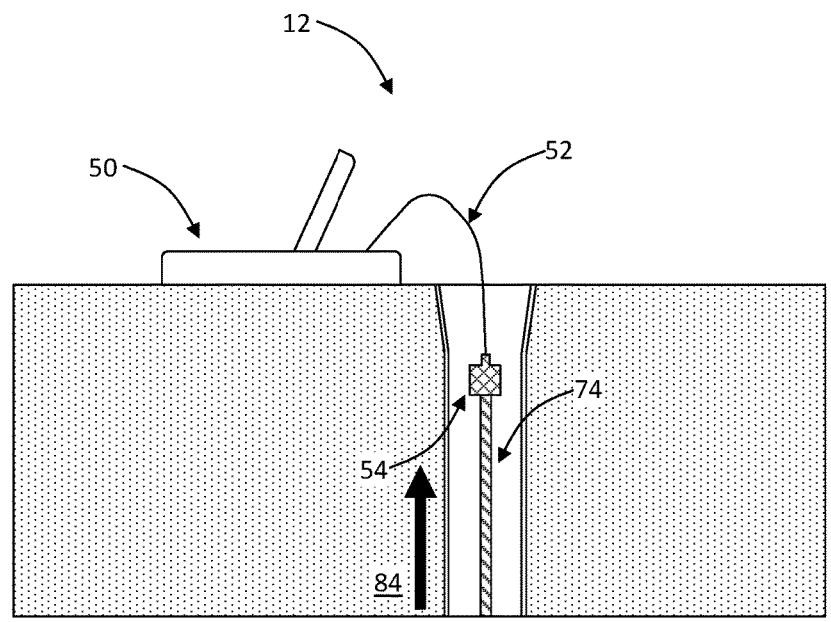
FIG. 3 is a schematic diagram illustrating one exemplary embodiment of the deployment of the accelerometer sensor unit of the present invention—the accelerometer sensor unit (A-SU) is another of the sensor units for the Hydro-RAT of the present invention.

Accelerometer Sensor Unit (A-SU): Referring to FIG. 3, an embodiment of the A-SU deployment 12 is illustrated. The A-SU deployment 12 is used to detect vibration signals 84 induced through an isolation valve's stem 74. The vibration signal 84 is detected by the A-SU accelerometer/pre-amplifier subsystem 54 which is magnetically attached to the valve stem 74. The detected signal is transmitted to the A-SU controller/processer 50 via a cable 52.

Figure 4:
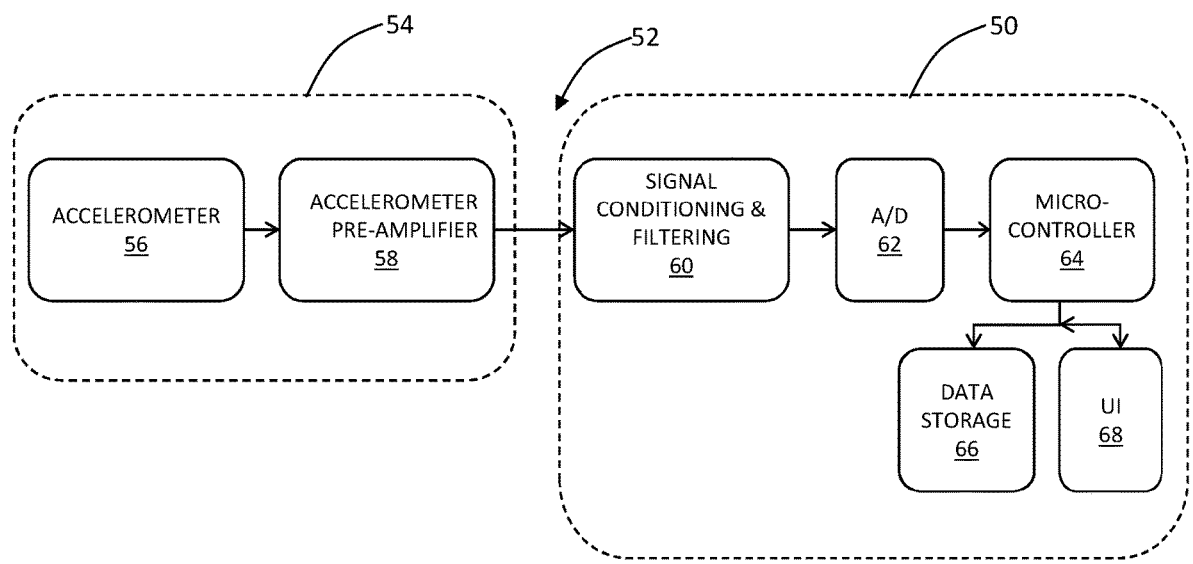
FIG. 4 is a schematic diagram illustrating one exemplary embodiment of the A-SU.

Referring to FIG. 4, a schematic for an embodiment of the A-SU is illustrated. Vibrational signals detected by the accelerometer 56 are amplified 58. Additional filtering and signal conditioning 60 is performed on the analog signal prior to digital conversion 62. The micro-controller 64 then processes the received digital vibrational signal to determine the valve-state-estimate. The received signal and related data is stored to the data storage 66. The process is controlled by an operator either locally or remotely via the User Interface 68. The valve-state-estimate evaluation may use additional information concerning the portion of the water distribution system under test, as an example, the acoustic signal for the valve-state-estimate reported by the H/P-SU, the GIS (geographic information system) layout of the water distribution system and/or prior H/P-SU and A-SU recorded measurements.

Operational Modes: There are various operational modes for the Hydro-RAT based on the sensor units used in the valve-state-estimation process. Four different operational modes are depicted in FIGS. 5 through 8 to illustrate the deployment and functional characteristics for each configuration.

Figure 5:
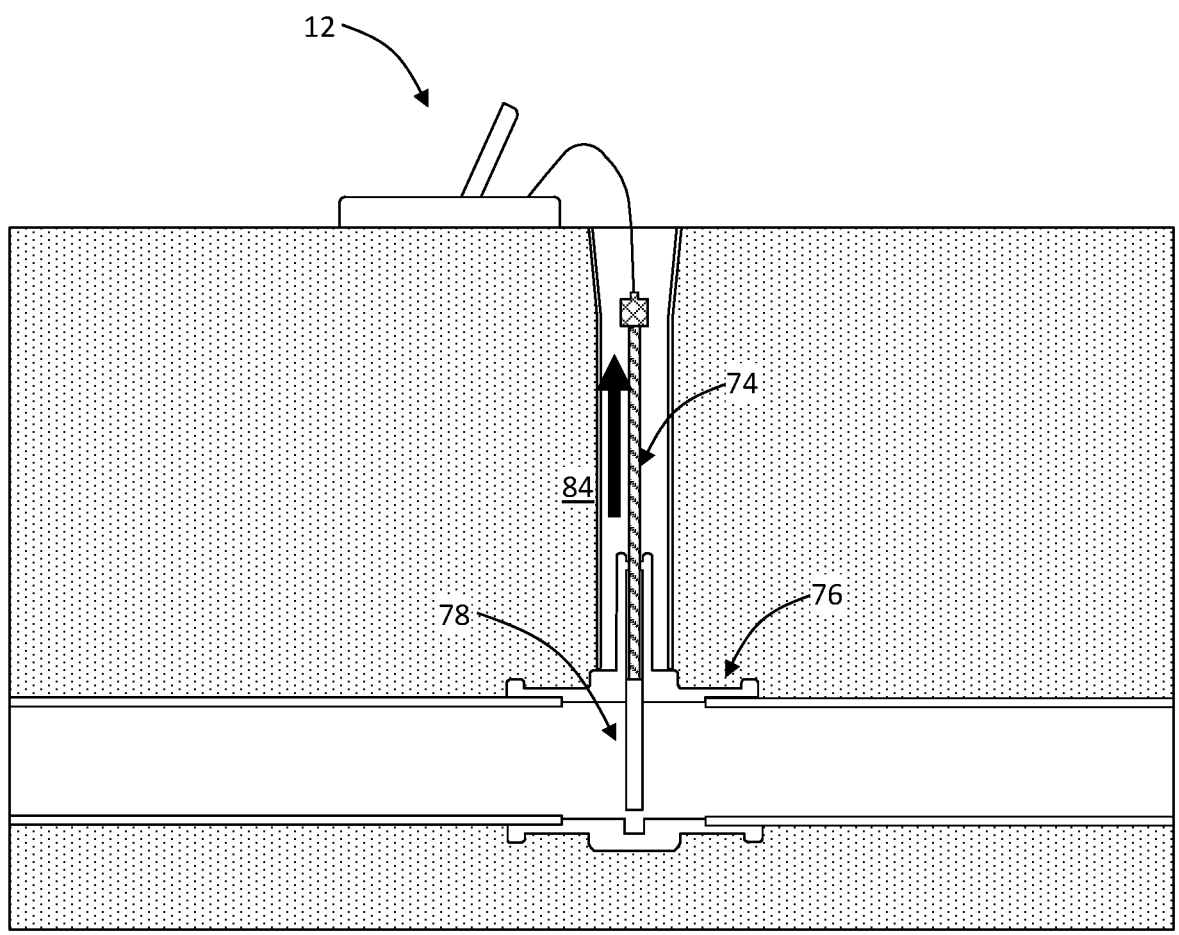
FIG. 5 is a schematic diagram illustrating one exemplary embodiment of the Hydro-RAT mode of operation based on the A-SU, Operational Mode I.

Operational Mode I: Referring to FIG. 5, the operational mode depicted in the figure is a single A-SU deployed 12 at an isolation valve 76 to detect vibrations 84 within the valve stem 74. The induced vibrations 84 within the valve gate 78 are conducted through the valve stem 74 and are detected by the A-SU 12. The induced vibrations within the gate are caused by the distribution line water flow. The induced vibrations result in distinct vibrational signatures based on the state of the valve's gate 78, e.g., open, closed, partially closed, etc.

Figure 6:
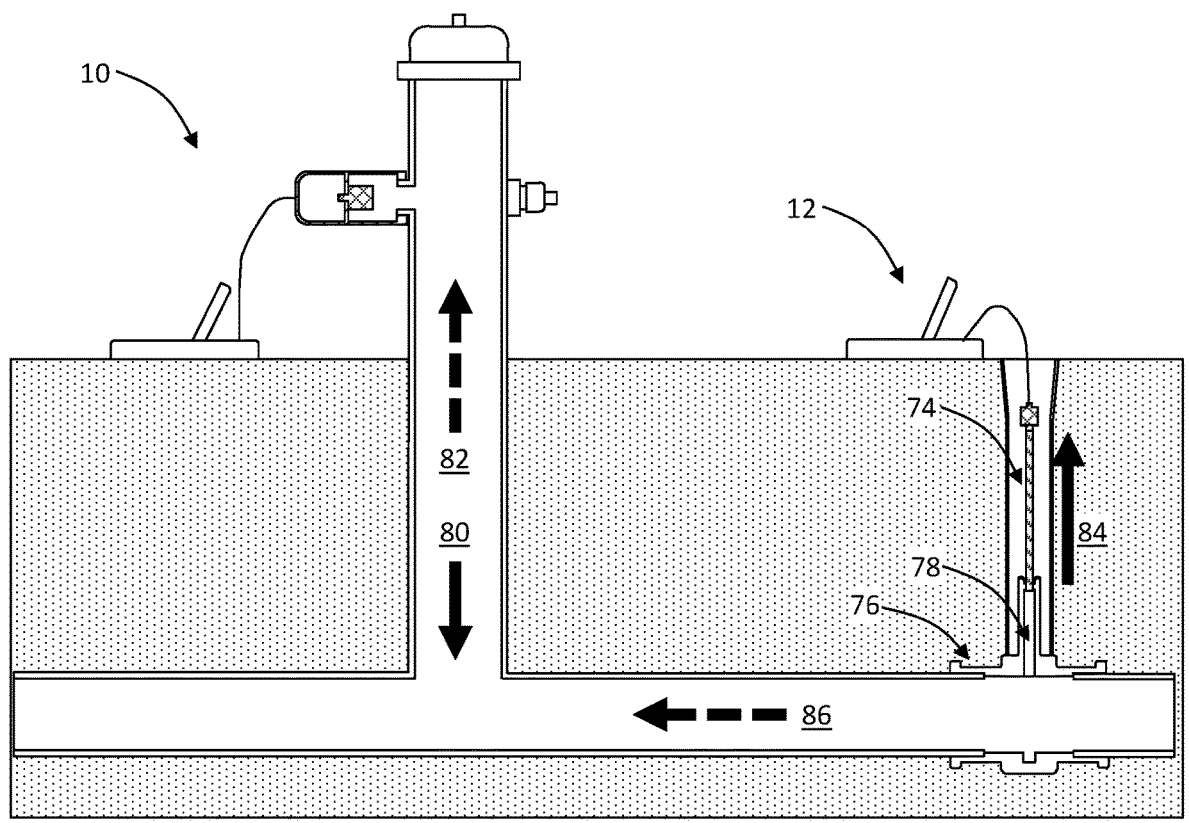
FIG. 6 is a schematic diagram illustrating one exemplary embodiment of the Hydro-RAT mode of operation based on a H/P-SU and a A-SU, Operational Mode II.

Operational Mode II: Referring to FIG. 6, the operational mode depicted in the figure is an H/P-SU deployed 10 at a fire hydrant with an A-SU deployed 12 at an isolation valve 76. The fire hydrant and isolation valve are on the same water distribution line and within the operational range of the H/P-SU. Using this operational mode there are two modalities for valve-state-estimation: acoustic and vibration. For the acoustic modality, the valve gate 78 will cause the generated structured acoustic signal 80 to generate a reflected signal 86. The characteristics of the reflected signal will be related to the state of the valve gate. The reflected signal's unique acoustic signature based on the valve gate can be detected in the received signal 82 at the H/P-SU 10. For the vibration modality, the induced vibrations 84 within the valve gate 78 are conducted through the valve stem 74 and are detected by the A-SU 12. The induced vibrations within the gate are caused by both the distribution line water flow and the generated acoustic signal 80 from the H/P-SU. The induced vibrations result in distinct vibrational signatures based on the state of the valve's gate 78, e.g., open, closed, partially closed, etc.

Figure 7:
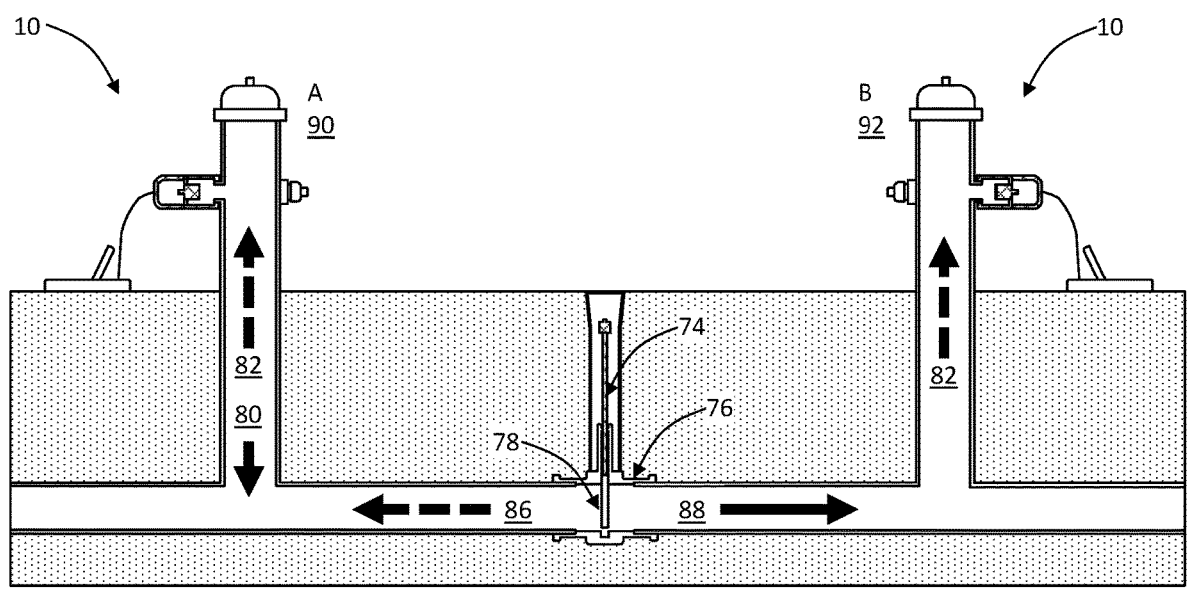
FIG. 7 is a schematic diagram illustrating one exemplary embodiment of the Hydro-RAT mode of operation based on multiple H/P-SU, Operational Mode III.

Operational Mode III: Referring to FIG. 7, the operational mode depicted in the figure is an H/P-SU deployed 10 at a fire hydrant 90-A and a second H/P-SU deployed 10 at a fire hydrant 92-B. The two fire hydrants and isolation valve are on the same water distribution line and the two fire hydrants are within the operational range of the H/P-SU. The isolation valve is located in-between the two H/P-SU deployed. For this discussion, in-between is based on the signal propagation characteristics within the water distribution pipe line network. In the embodiment depicted in the figure, two H/P-SUs are deployed, it is straight forward to extend this operational mode to include additional H/P-SU. The additional H/P-SU measurements enhance the valve-state-estimate under more complex water distribution network geometries potentially involving multiple isolation valves in-between the H/P-SUs.

For the operational mode depicted in FIG. 7, there are four modalities for valve-state-estimation based on the acoustic signal transmission and reflection. For the first acoustic modality, the valve gate 78 will cause the generated structured acoustic signal 80 to generate a reflected signal 86. The characteristics of the reflected signal will be related to the state of the valve gate. The reflected signal's unique acoustic signature based on the valve gate can be detected in the received signal 82 at the H/P-SU 10 at location 90-A. The second acoustic modality is based on the transmitted signal 88 passed through the isolation valve 76. The transmitted signal 88 is the portion of the generated acoustic signal 80 which is transmitted through or around the valve gate 78. The characteristics of this transmitted signal will be related to the state of the valve gate. The transmitted signal's unique acoustic signature based on the valve gate can be detected in the received signal 82 at the H/P-SU 10 at location 92-B. The third and fourth acoustic modalities are based on switching the roles of the two H/P-SUs, i.e., the H/P-SU at 92-B transmits a structured acoustic signal and the reflected signal is received by the H/P-SU at 92-B and the transmitted signal is received by the H/P-SU at 90-A. Using all four modalities to evaluate the valve-state-estimate exploits the asymmetric characteristics of the water distribution network between the H/P-SU and thereby improving the estimation.

Figure 8:
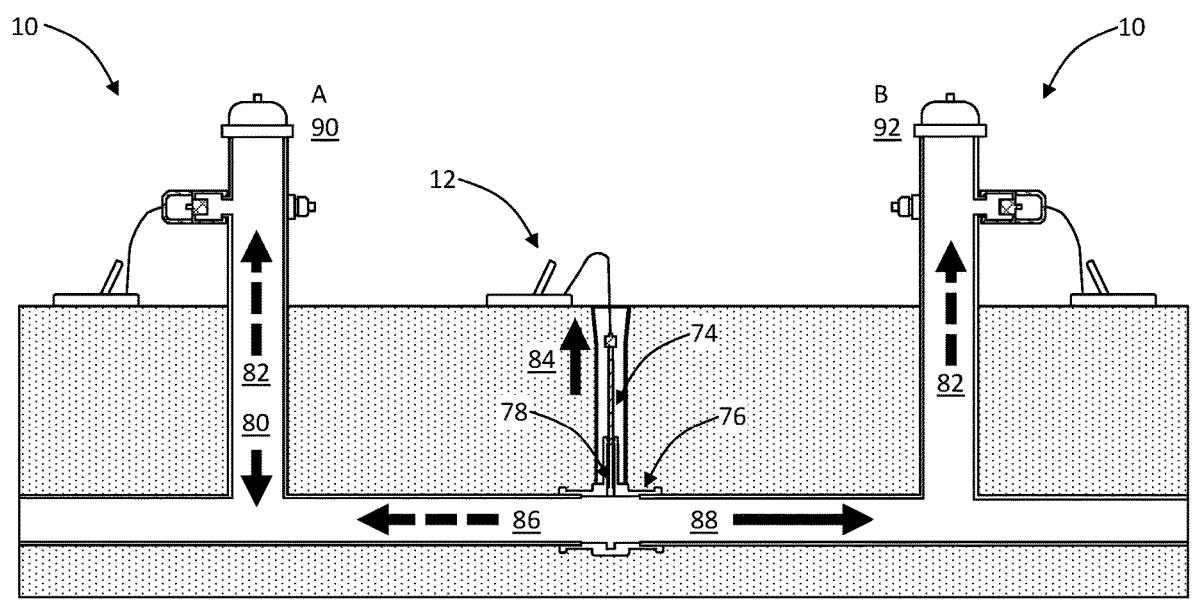
FIG. 8 is a schematic diagram illustrating one exemplary embodiment of the Hydro-RAT mode of operation based on multiple H/P-SU and one or more A-SU, Operational Mode IV.

Operational Mode IV: Referring to FIG. 8, the operational mode depicted in the figure is an H/P-SU deployed 10 at a fire hydrant 90-A, a second H/P-SU deployed 10 at a fire hydrant 92-B and an A-SU deployed 12 at an isolation valve 76. The two fire hydrants and isolation valve are on the same water distribution line and the two fire hydrants are within the operational range of the H/P-SU. The isolation valve is located in-between the two H/P-SUs deployed. For this discussion, in-between is based on the signal propagation characteristics within the water distribution pipe line network. In the embodiment depicted in the figure two H/P-SUs are deployed and one A-SU, it is straight forward to extend this operational mode to include additional H/P-SU and additional A-SU. The additional sensor unit measurements enhance the valve-state-estimate under more complex water distribution network geometries potentially involving multiple isolation valves in-between the H/P-SUs.

For the operational mode depicted in FIG. 8, there are six modalities which are used for valve-state-estimation based on the acoustic signal transmissions/reflections and induced vibration signals. In brief, the same four acoustic modalities are present as discussed in the previous paragraphs for the operational mode with two H/P-SUs. In addition, there are vibration modalities which are the same as discussed for the operational mode with a single H/P-SU and an A-SU. For this operational mode, there are two vibration modalities based on the two acoustic sources located at 90-A and 92-B.

Valve-State-Estimation Feature Set: Acoustic signals have long been used for imaging with pattern recognition techniques employed to implement decision processing. For valve-state-estimation, the Hydro-RAT implements a similar approach where a feature set is extracted from the acoustic and vibrational signals from the relevant A-SU and H/P-SU measurements. The valve-state-estimate is determined by comparing the extracted feature set to exemplars based on employing a standard pattern recognition technique.

Figure 9:
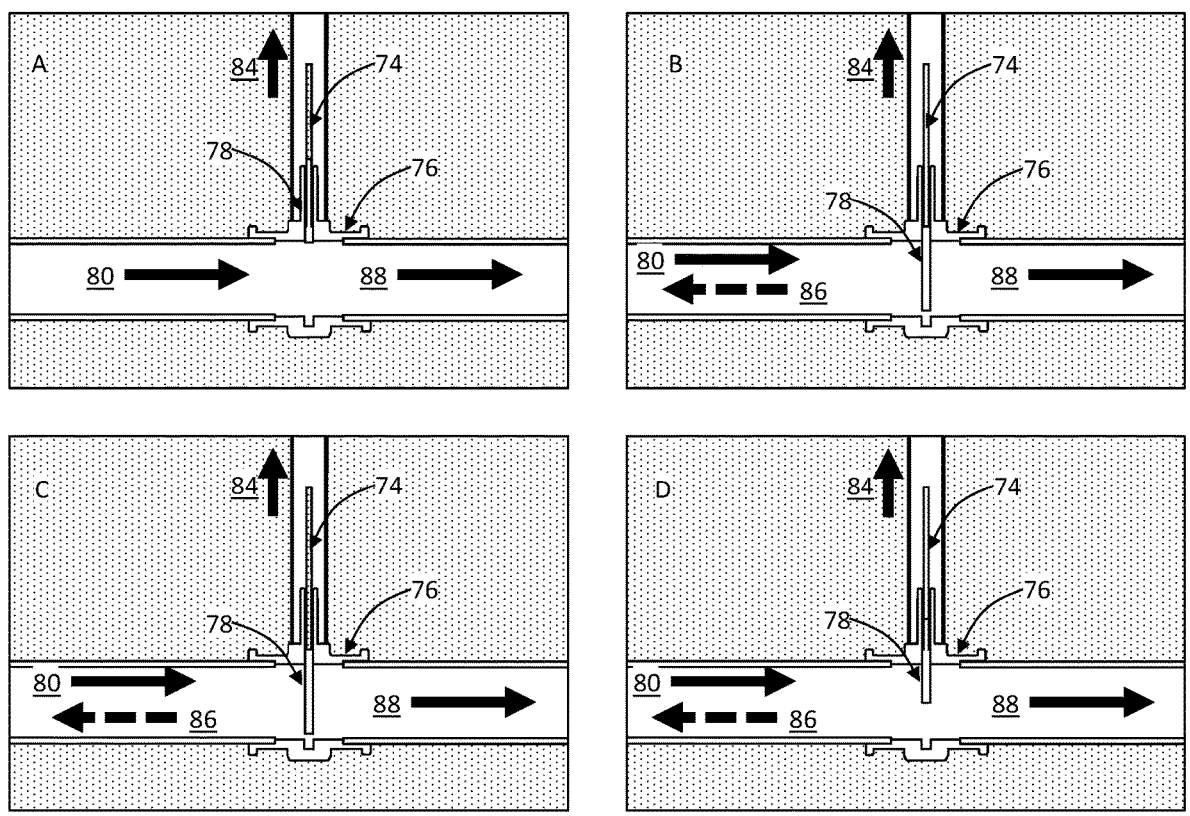
FIG. 9 is a schematic diagram illustrating exemplary embodiments of the acoustic signal and induced vibrational signal characteristics under four different valve gate position states (A) Open, (B) Closed, (C) 90% Closed, and (D) 40% Closed.

Referring to FIG. 9, this figure illustrates conceptually the characteristics of the acoustic signal and vibrational signal under four different valve gate position states.

In FIG. 9 A, the valve gate 78 is in the open position. Under this gate position, the transmitted acoustic signal 88 resulting from the transmission of the H/P-SU generated acoustic signal 80 through the isolation valve 76 has minimal attenuation and phase distortion. The reflected acoustic signal 86 from the valve gate 78 will either not be present or will be highly attenuated based on the gate design. In addition, the induced vibration through the gate 78 and into the valve stem 74 will be minimal, i.e., it will be consistent with the background vibrational noise.

In FIG. 9 B, the valve gate 78 is in the closed position. Under this gate position, the characteristics of the transmitted acoustic signal 88 and reflected acoustic signal 86 resulting from the transmission of the H/P-SU generated acoustic signal 80 are governed by Snell's law. The transmitted acoustic signal 88 results from the refraction of the acoustic wave at both boundaries of the valve gate 78. Due to the variation in the velocity of sound in water versus the velocity of sound in the gate, a signification portion of the signal is reflected versus transmitted through the gate. In addition, the acoustic signal induces a vibrational signal within the valve gate which in-turn is transmitted to the valve stem. When the valve gate is fully closed, the water flow is zero so there is no additional acoustic signal or induced vibrational signal due to the water flow.

In FIG. 9 C and D, the valve gate 78 is 90% and 40% closed, respectively. Under these gate positions, the characteristics of the transmitted acoustic signal 88 and reflected acoustic signal 86 resulting from the transmission of the H/P-SU generated acoustic signal 80 are governed by a superposition of Snell's law and straight transmission, to a first order approximation. The transmitted acoustic signal 88 results from the refraction of the acoustic wave at both boundaries of the valve gate 78 based on the percentage of the gate's surface area that is within the pipe. Due to the variation in the velocity of sound in water versus the velocity in the gate, a significant portion of the signal is reflected versus transmitted through the gate based on the percentage of the gate's surface area that is within the pipe. In addition, the acoustic signal induces a vibrational signal within the valve gate which in-turn is transmitted to the valve stem. Since the valve gate is not fully closed, water flows under the valve gate resulting in an increased turbulence due to the restricted flow. The turbulent flow induces a vibrational signal in the gate which is transmitted to the valve stem and generates an acoustic signal which is transmitted within the water pipeline.

Building on the previous discussion outlining the signal characteristics. Over a sufficiently short time interval each water pipeline section can be viewed as a linear time invariant system. This approximation is based on the dynamics of the water flow and that variations in the pipeline occur slowly. Therefore the pipeline impulse response between two fire hydrants, h(t), will be statistically invariant over a limited time interval.

Figure 10:
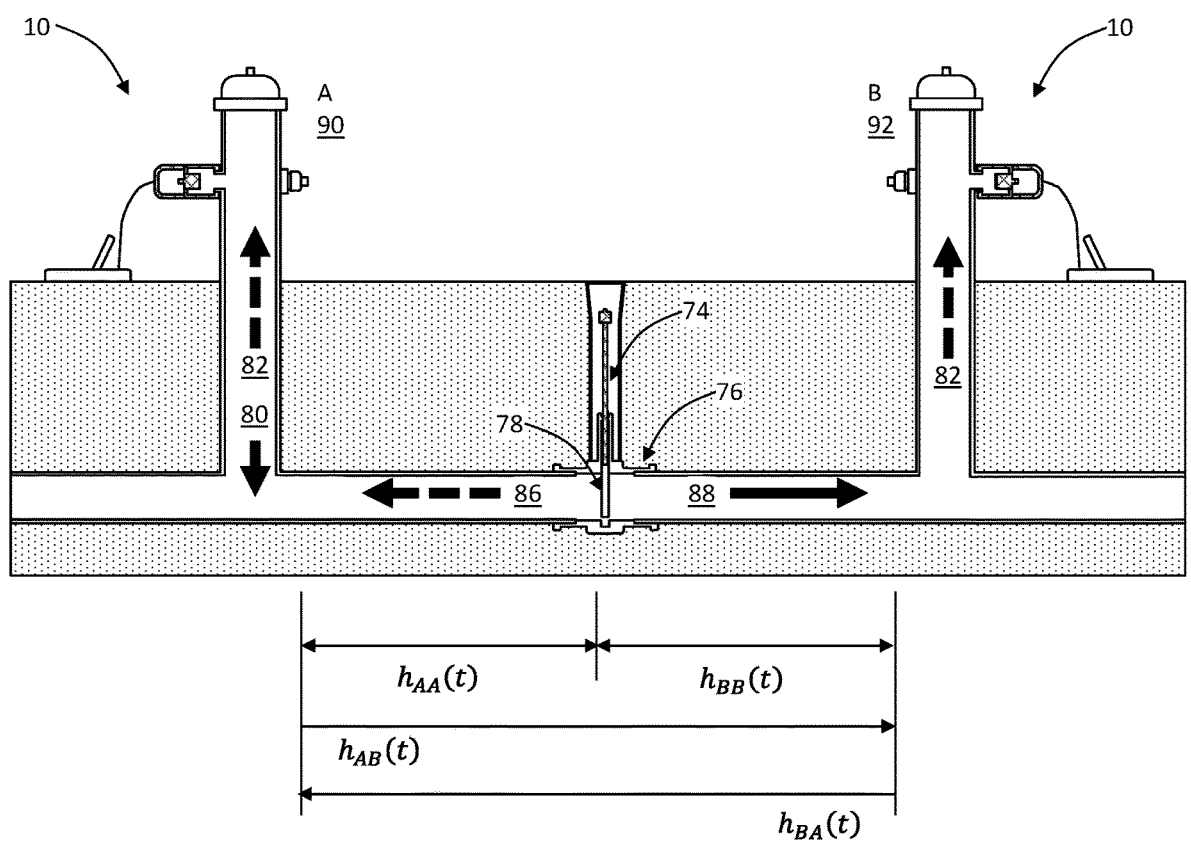
FIG. 10 is a schematic diagram illustrating two port analysis for evaluating valve-state-estimate based on the Hydro-RAT operational Mode III, i.e., multiple H/P-SU.

FIG. 10 illustrates an embodiment which exemplifies one method for obtaining the valve-state-estimation feature set used in classifying the valve-state. For this embodiment, Hydro-RAT operational Mode III is illustrated in which H/P-SU are deployed at fire hydrants 90-A and 92-B. Upon testing the state of the valve located between the two H/P-SUs, the measured transmitted and reflected acoustic signals are used to estimate the corresponding impulse response. The valve-state-estimation feature set is then the set of estimated impulse responses, $\{\hat{h}_{AB}(t), \hat{h}_{AB}(t), \hat{h}_{BA}(t), \hat{h}_{BB}(t)\}$. The feature set provides a two port analysis for each water pipeline section which can be used in evaluating the water distribution/transmission network using classical network theory and pattern classification approaches.

Figure 11:
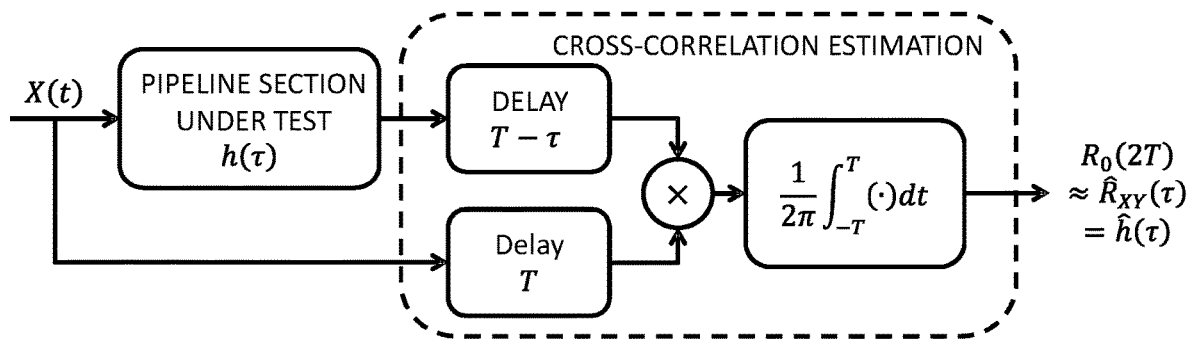
FIG. 11 is a block diagram illustrating an exemplary method for estimating the pipeline section impulse response using a cross-correlation approach.

Various approaches are available for estimating the impulse response for a water pipeline section based on the acoustic signal transmission or reflection. One approach is depicted in FIG. 11, where the acoustic signal transmitted at the source H/P-SU projector, X(t), is a maximum length sequence (MLS). MLS are pseudo-random sequences with an approximate constant power spectral density and an auto correlation of $$R_{XX}(\tau) \approx \frac{N_0}{2}\delta(\tau).$$

Using the MLS sequence, the estimated impulse response of the water pipeline section under test, i.e., the water pipeline section between the H/P-SU projector and H/P-SU hydrophone is:

$$h(\tau) \approx \hat{h}(\tau) = \hat{R}_{XY}(\tau) \approx \frac{1}{2\pi}\int_{-T}^{T} x(t)y(t+\tau)dt$$

given T is sufficiently large and the impulse response is stationary over the interval 2T.

As illustrated in FIGS. 9 and 10, the valve gate position within the water pipeline section affects the estimated impulse responses, $\{\hat{h}_{AA}(t), \hat{h}_{AB}(t), \hat{h}_{AB}(t), \hat{h}_{AB}(t)\}$. The valve-state-estimation feature set based on the two port impulse response analysis provides a significant degree of redundancy which improves the detection reliability, but at the cost of increased computational complexity. An alternative embodiment is to evaluate the transmission sound pressure level (SPL) at multiple frequency bands rather than evaluate the impulse response. In either case, the A-SU vibrational signal can be used in a similar fashion to augment the valve-state-estimation feature set. The A-SU feature set is based on a different mechanism, and provides additional discrimination potential for resolving the valve-state-estimation.

Figure 12:
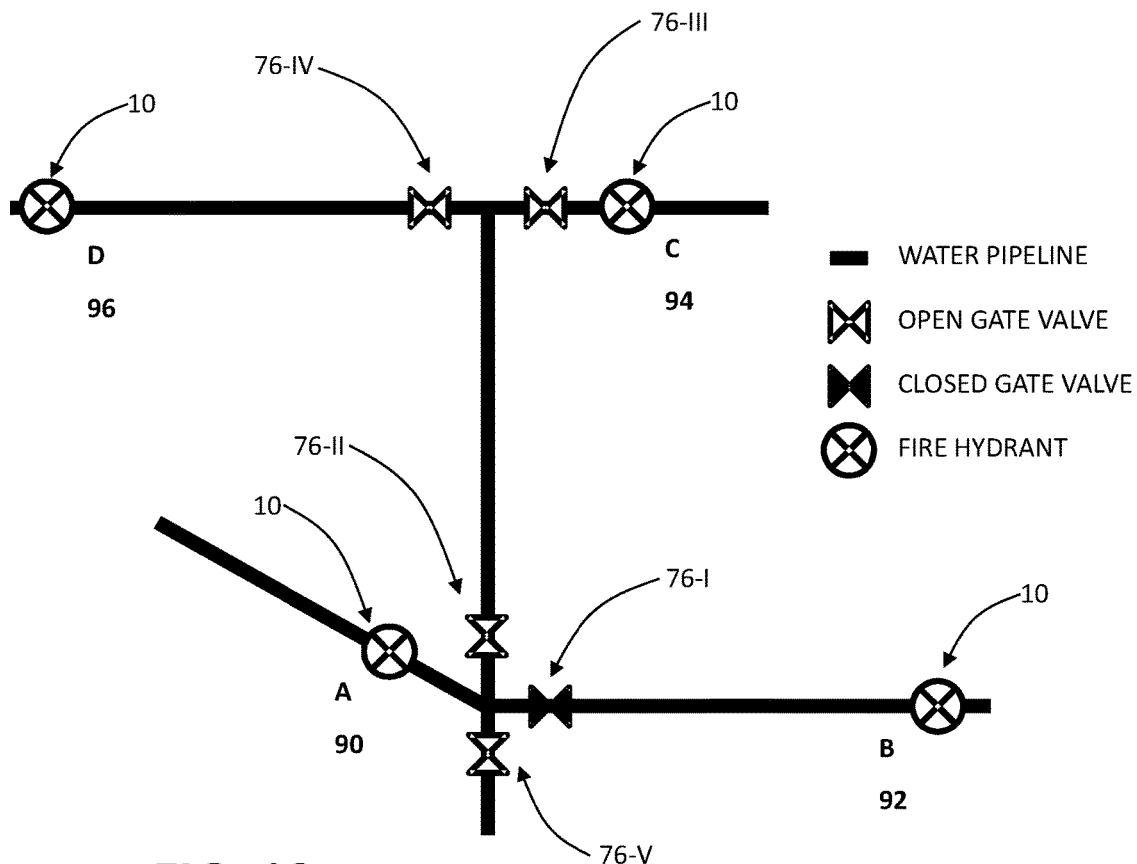
FIG. 12 is a block diagram illustrating an exemplary method for implementing the Hydro-RAT based on operational Mode III, i.e., multiple H/P-SU.

Valve-State-Estimation In Water Distribution Network: Referring to FIG. 12, the graphic depicts an embodiment of a method for implementing the Hydro-RAT within a water distribution network. The embodiment is based on the Hydro-RAT operational Mode III, where four H/P-SUs are deployed at the four fire hydrants: 90-A, 92-B, 94-C, and 96-D. The valve-state-estimate for valve 76-I is obtained by using the H/P-SUs to conduct a two port analysis of the water pipeline section between fire hydrant 90-A and 92-B. Testing for the single valve between the two fire hydrants is consistent with the procedure discussed in conjunction with the graphic in FIG. 10.

To provide a spatial context for valve and hydrant placement within a water distribution/transmission network, the standards and specifications for the Charlotte-Mecklenburg utilities is summarized. Maximum spacing between isolation valves is 1500' in distribution network and 3000' in transmission lines. Two valves are required at each tee connection and three valves at each cross connection. Fire hydrant spacing is specified by the NC DHS which requires hydrants within a radial distance of 1000' from each residence and 500' from each business.

The two port analysis between each pair of HP-SUs can occur essentially concurrently by simultaneously deploying four HP-SUs, i.e., one at each fire hydrant. Alternatively, due to the stationary characteristics of the water distribution network over short time intervals, the two port analysis can be conducted pairwise. For the pairwise deployment approach, the HP-SUs are deployed systematically to evaluate each water pipeline segment containing a valve to be tested. Using the pairwise approach, the number of deployments required for evaluating the valve-state-estimate is dependent on the relative location of the fire hydrants to the valves. In the case illustrated in FIG. 12, valve 76-I is uniquely evaluated by deploying H/P-SUs at 90-A and 92-B. Valves 76-II, 76-III, and 76-IV are not isolated between a pair of fire hydrants. In general, obtaining the valve-state-estimate for the valves requires two port analysis conducted between multiple water pipeline sections. For the illustrated case, the set of two port analyses conducted between {90-A to 92-B, 90-A to 94-C, 94-C to 96-D} is sufficient for evaluating the four valves.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for valve position state estimation within a conduit or conduit network, comprising:
   acoustically coupling a plurality of acoustic sensors to a fluid disposed within the conduit or conduit network, wherein one of the plurality of acoustic sensors is disposed upstream of a valve under test and one of the plurality of acoustic sensors is disposed downstream of the valve under test;
   transmitting a structured acoustic signal from a transmitting acoustic sensor to a receiving acoustic sensor, wherein the structured acoustic signal passes through the valve under test between the transmitting acoustic sensor and the receiving acoustic sensor;
   at the transmitting acoustic sensor, receiving a reflected structured acoustic signal after the structured acoustic signal is reflected from the valve under test; and
   using a two-port analysis, characterizing a flow state of the valve under test based on the structured acoustic signal received at the receiving acoustic sensor and the reflected structured acoustic signal received at the transmitting acoustic sensor, wherein the flow state of the valve under test is characterized using a pattern recognition technique employing an exemplar extracted feature set providing a representational model of a feature set not specific to the valve under test that can be used in a classification process, and wherein the flow state of the valve under test is characterized using one of impulse response and a transmission sound pressure level at multiple frequency bands.

2. The method of claim 1, further comprising coupling an accelerometer sensor to the valve under test and obtaining vibrational measurements from the valve under test.

3. The method of claim 2, further comprising characterizing the flow state of the valve under test based on the vibrational measurements obtained by the accelerometer sensor.

4. The method of claim 1, wherein characterizing the flow state of the valve under test comprises characterizing a degree to which the valve under test is opened or closed.

5. The method of claim 4, wherein characterizing the flow state of the valve under test further comprises concurrently or serially characterizing a degree to which another valve under test is opened or closed.

6. The method of claim 1, wherein characterizing the flow state of the valve under test further comprises incorporating one or more of geographic information system (GIS) layout data related to a water system under test and prior characterizations of the flow state of the valve under test.

7. A method for valve position state estimation within a conduit or conduit network, comprising:
   coupling an accelerometer sensor to a valve under test and obtaining vibrational measurements from the valve under test;
   characterizing a flow state of the valve under test based on the vibrational measurements obtained by the accelerometer sensor;
   acoustically coupling a plurality of acoustic sensors to a fluid disposed within the conduit or conduit network, wherein one of the plurality of acoustic sensors is disposed upstream of a valve under test and one of the plurality of acoustic sensors is disposed downstream of the valve under test;
   transmitting a structured acoustic signal from a transmitting acoustic sensor to a receiving acoustic sensor, wherein the structured acoustic signal passes through the valve under test between the transmitting acoustic sensor and the receiving acoustic sensor;
   at the transmitting acoustic sensor, receiving a reflected structured acoustic signal after the structured acoustic signal is reflected from the valve under test; and
   using a two-port analysis, characterizing the flow state of the valve under test based on the structured acoustic signal received at the receiving acoustic sensor and the reflected structured acoustic signal received at the transmitting acoustic sensor, wherein the flow state of the valve under test is characterized using a pattern recognition technique employing an exemplar extracted feature set providing a representational model of a feature set not specific to the valve under test that can be used in a classification process, and wherein the flow state of the valve under test is characterized using one of impulse response and a transmission sound pressure level at multiple frequency bands.

8. The method of claim 7, wherein characterizing the flow state of the valve under test comprises characterizing a degree to which the valve under test is opened or closed.

9. The method of claim 8, wherein characterizing the flow state of the valve under test further comprises concurrently or serially characterizing a degree to which another valve under test is opened or closed.

10. The method of claim 7, wherein characterizing the flow state of the valve under test further comprises incorporating one or more of geographic information system (GIS) layout data related to a water system under test and prior characterizations of the flow state of the valve under test.

11. An apparatus for valve position state estimation within a conduit or conduit network, comprising:
    a plurality of acoustic sensors configured to be acoustically coupled to a fluid disposed within the conduit or conduit network, wherein one of the plurality of acoustic sensors is disposed upstream of a valve under test and one of the plurality of acoustic sensors is disposed downstream of the valve under test;
    the plurality of acoustic sensors operable for transmitting a structured acoustic signal from a transmitting acoustic sensor to a receiving acoustic sensor, wherein the structured acoustic signal passes through the valve under test between the transmitting acoustic sensor and the receiving acoustic sensor;
    the plurality of acoustic sensors operable for, at the transmitting acoustic sensor, receiving a reflected structured acoustic signal after the structured acoustic signal is reflected from the valve under test; and an algorithm for, using a two-port analysis, characterizing a flow state of the valve under test based on the structured acoustic signal received at the receiving acoustic sensor and the reflected structured acoustic signal received at the transmitting acoustic sensor, wherein the flow state of the valve under test is characterized using a pattern recognition technique employing an exemplar extracted feature set providing a representational model of a feature set not specific to the valve under test that can be used in a classification process, and wherein the flow state of the valve under test is characterized using one of impulse response and a transmission sound pressure level at multiple frequency bands.

12. The apparatus of claim 11, further comprising an accelerometer sensor configured to be coupled to the valve under test and obtain vibrational measurements from the valve under test.

13. The apparatus of claim 12, further comprising an algorithm for characterizing the flow state of the valve under test based on the vibrational measurements obtained by the accelerometer sensor.

14. The apparatus of claim 11, wherein characterizing the flow state of the valve under test comprises characterizing a degree to which the valve under test is opened or closed.

15. The apparatus of claim 14, wherein characterizing the flow state of the valve under test further comprises concurrently or serially characterizing a degree to which another valve under test is opened or closed.

16. The apparatus of claim 11, wherein the algorithm for characterizing the flow state of the valve under test further incorporates one or more of geographic information system (GIS) layout data related to a water system under test and prior characterizations of the flow state of the valve under test.

* * * * *